Figure 1:
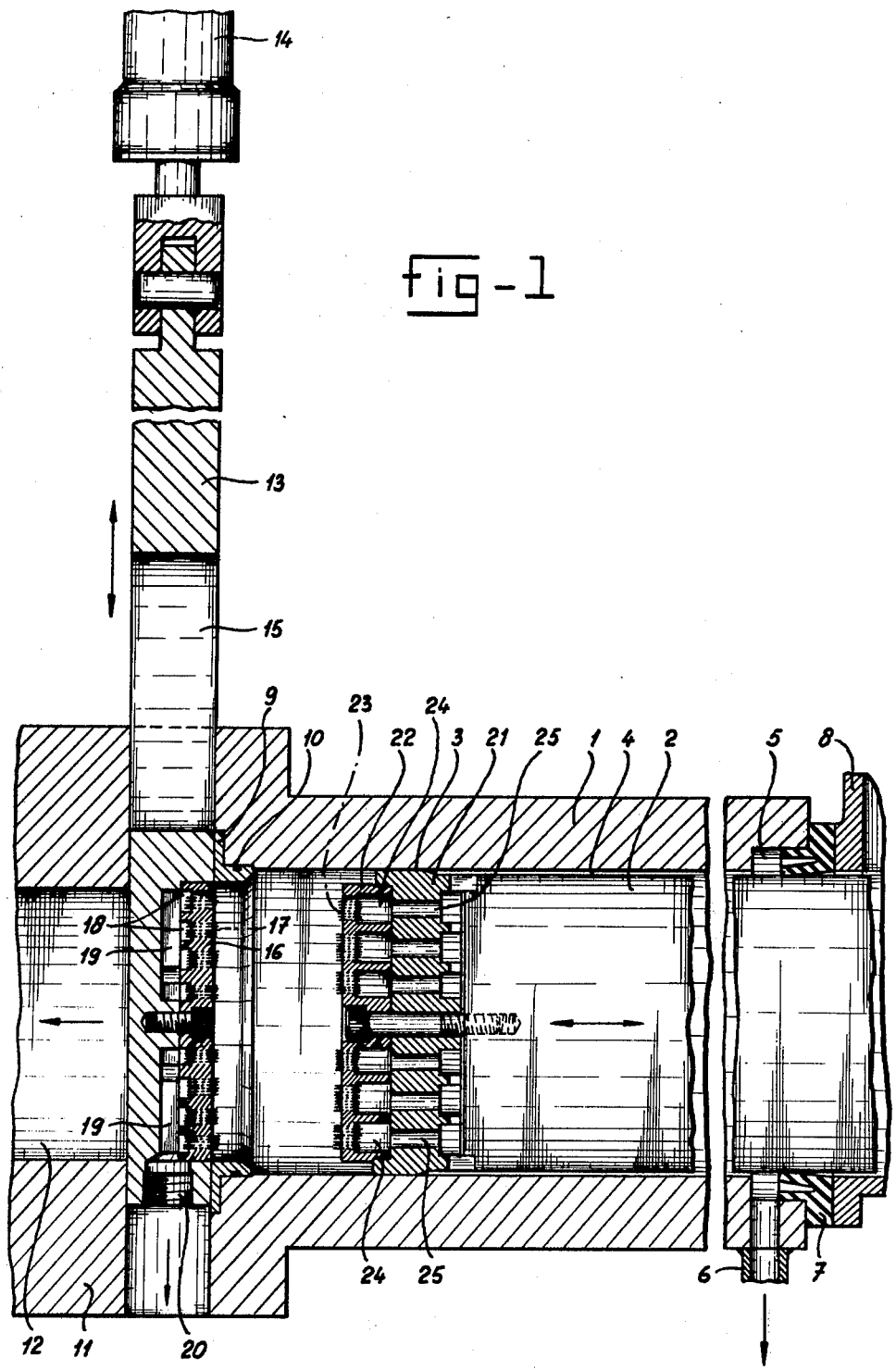

United States Patent [19]

Van Bergen

[11] 4,141,113

[45] Feb. 27, 1979

[54] PRESS FOR SEPARATING MEAT AND BONES

[75] Inventor: Theodorus Van Bergen, Oss, Netherlands

[73] Assignee: Protecon B.V., Oss, Netherlands

[21] Appl. No.: 810,787

[22] Filed: Jun. 28, 1977

[30] Foreign Application Priority Data

Jun. 30, 1976 [NL] Netherlands ......................... 7607187
Jun. 2, 1977 [GB] United Kingdom ............... 23706/77

[51] Int. Cl.² .............................................. A22C 17/04
[52] U.S. Cl. ...................................... 17/1 G; 241/68; 241/84; 241/89.1
[58] Field of Search ............... 17/1 G, 46, 56; 241/68, 241/4, 82.1, 83, 84, 84.4, 89, 89.1, 89.2, 82.2

[56] References Cited

U.S. PATENT DOCUMENTS

| | | | |
|---|---|---|---|
| 2,425,912 | 8/1947 | Appel et al. | 241/84.4 |
| 4,014,075 | 3/1977 | Van Bergen | 17/1 G |
| 4,025,985 | 5/1977 | Rousseau | 17/1 G |

FOREIGN PATENT DOCUMENTS 1066902  10/1959  Fed. Rep. of Germany ............ 17/1 G Primary Examiner—Willie G. Abercrombie
Attorney, Agent, or Firm—Bucknam and Archer

[57] ABSTRACT

A press for putting under pressure therein animal meat with bones in order to bring the meat into a paste-like condition and thus to have it flow out of the space within the press, comprises a slide valve adapted to open and close a large opening in the front face of the space within the press in order to allow, after opening thereof, discharge of the bones remaining in said space after pressing by moving the movable pressing body further in the pressing direction with respect to the press cylinder, a number of fine openings for allowing passage of meat in a paste-like condition so located as to open into a surface perpendicular to the direction of movement of the pressing body, said openings give communication to a discharge of such meat paste from the space within the press, said openings being movable in such a way that their entries bordering the space within the press will slide along another metal part of the structure when the slide valve is moved.

17 Claims, 2 Drawing Figures

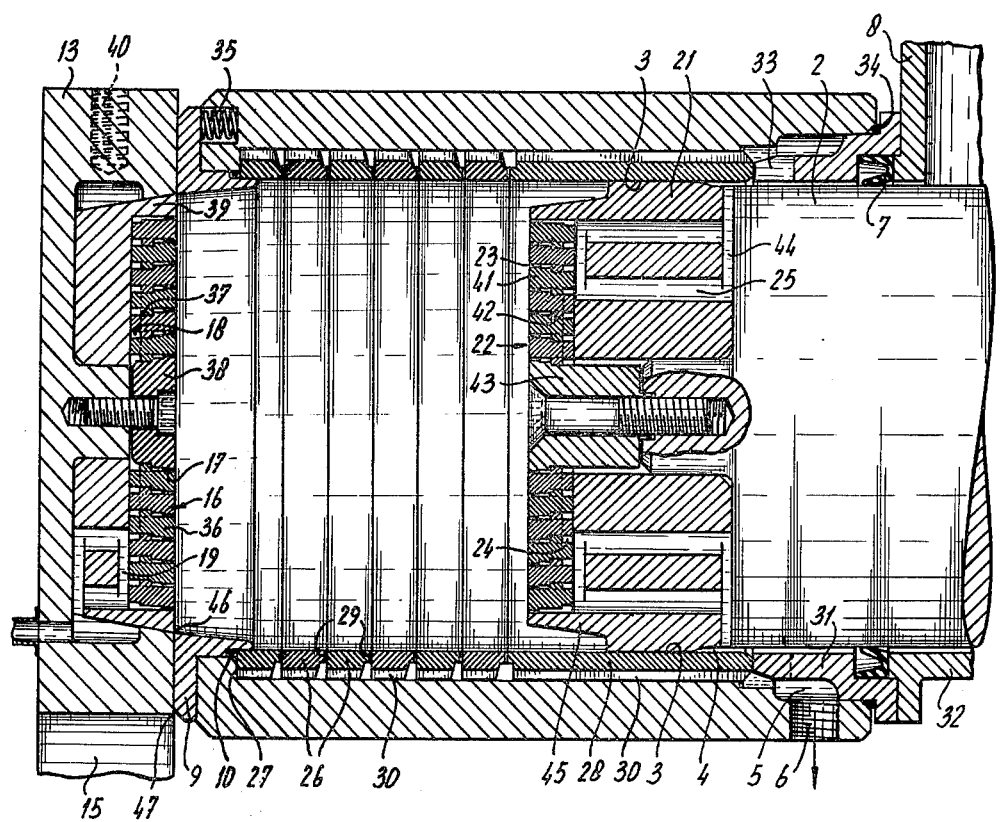

PRESS FOR SEPARATING MEAT AND BONES

This invention relates to a press for putting under pressure therein animal meat with bones in order to bring the meat into a paste-like condition and thus to have it flow out of the space within the press, with a slide valve adapted to open and close a large opening in the front face of the space within the press in order to allow, after opening thereof, discharge of the bones remaining in said space after pressing by moving the movable pressing body further in the pressing direction with respect to the press cylinder.

A similar press is known from Netherlands Patent Application No. 74.11576. Therein the large opening, through which the bones may be pressed out of the space within the press is much smaller in transverse section than the press space, and there is a number of annular bodies positioned within the press cylinder near the slide valve, which annular bodies border an opening of a substantially conical shape becoming narrower towards the slide valve and have an internal shape which smoothly converges from the inner wall of the press cylinder to the discharge opening at the slide valve, between which annular bodies there are small discharge openings for the meat paste. The discharge of the bones in this known structure takes much energy and moreover there is the danger that small splinters of bone leave the press with the meat paste. Moreover a considerable part of the meat brought by the pressure into a paste-like condition will lay back a rather long path through the mass of bones and meat in order to reach a meat discharge opening.

The invention mainly aims at improving such structures in view of the said disadvantages and to this end the press according to the invention is characterized in that a number of fine openings for allowing passage of meat in paste-like condition is arranged so as to open into a surface perpendicular to the direction of movement of the pressing body, said openings giving communication to a discharge of such meat paste from the space within the press, said openings being movable in such a way that their entries bordering the space within the press will slide along another metal part of the structure when the slide valve is moved.

Such fine openings may be present in the slide valve or in the front face of the movable pressing body, a plunger or piston, or in both. It is now always possible when opening or closing the slide valve to have a scraping movement of an edge of the press space and/or of the opening in the slide valve in order to clean the entries of such fine openings by removing splinters of bones, which thereby will stay back in the press space or in the passage opening in the slide valve in order to be discharged from the press space with the bones in a subsequent bone discharge movement of the pressing body after the slide valve has (again) reached the open position.

If the fine openings are provided in the front face of the movable pressing body, said body is adapted to move with said front face into the corresponding front face of the slide valve, of course only when the slide valve is opened because otherwise the bones present in the press space would avoid this. When closing the slide valve this will slide along said front face of the pressing body, so that the edge of the opening in the slide valve will have a cleaning action on the fine openings in the front face of the pressing body, while also the remaining bones will be discharged from the press space as completely as possible by this continued movement of the pressing body to such an advanced position.

If the fine openings are provided in the slide valve these will be scraped to be cleaned when the slide valve opens and thus scrapes along an edge of the press space.

If the openings are provided in both parts they can moreover when closing the slide valve slide along each other to be subjected to an additional cleaning action.

Where fine openings as indicated above are provided in the front face of the movable pressing body, this is preferably according to the invention realized in such a way that behind the body with fine openings forming the front face of the movable pressing body there is a space in said body for giving a flow connection for meat paste passing through said openings to the outer peripheral wall of the movable pressing body behind said body with fine openings, the pressing body behind said body with fine openings having a clearance in and with respect to the inner surface of the press cylinder, said clearance space giving connection to a discharge for meat paste positioned at a distance away from the slide valve.

The said fine openings, whether provided in the slide valve or in the pressing body or in both are preferably provided in a disc shaped body, supported at its back surface by a part of either the slide valve or the movable pressing body having recesses to allow passage of the meat paste. Such disc shaped bodies may easily be separated from the slide valve or the pressing body to be cleaned, inspected or replaced.

It is moreover often preferred to provide a separate annular body in the press space around the opening thereof bordering the slide valve, which annular body is guided in a sense as to be at least somewhat axially slidable in the press space and thus is pressed by the pressure during pressing in said press space against the slide valve, the front face of the movable pressing body being movable into and out of said annular body with slight clearance between said front part of the press body and said annular body.

In order to obtain a favourable ratio between pressure and capacity it is often desired and preferable to realize the invention in such a way that there is moreover a number of fine openings for allowing passage of meat in the peripheral wall of the press space substantially perpendicular to the direction of movement of the pressing body, i.e. in the inner wall of the press cylinder. Where there is also a number of fine openings in the front face of the movable pressing body, the meat passing through both sets of openings may have a common discharge near the area where the movable press body enters the press space.

The invention will now be explained in more detail with reference to two preferred embodiments given in the enclosed drawings. In said drawings:

FIG. 1 shows the main parts of a press according to the invention in a first embodiment with parts broken away; and FIG. 2 shows a press according to the invention in a second embodiment, also with parts broken away.

In FIG. 1, 1 is a press cylinder, in which a movable pressing body in the shape of a piston 2 is movable back and fro. At the right of the parts shown in the drawing there are conventional driving means such as a hydraulic or pneumatic cylinder with piston etc. to move the press piston 2 back and fro. Between said driving means and the part of piston 2 shown in the drawing there is a filling space for meat and bones bordered at the left by a wall 8 and having a cover which may easily be opened and closed, and there may also be suitable control and switch means for the piston and other necessary parts, for instance as given in more detail in Netherlands Patent Application No. 74.11576 indicated above.

The front part of piston 2 fits with a sliding fit at 3 in the inner wall of the cylinder 1 and behind this part 3 there is an annular space 4 all around between piston and cylinder, which space 4 gives a connection to a discharge space 5 for meat connected to a discharge duct 6.

A sealing ring 7 of rubber or the like is supported against wall 8 bordering the filling space and said ring gives a seal between the outer periphery of piston 2 and the right end of the discharge space 5 for the discharge of the paste-like meat.

At the left end of FIG. 1 the cylinder 1 has an annulus 9 sealed by an O-ring 10 in the inner wall of the cylinder, which annulus 9 with respect to the press cylinder has some possibility of sliding in horizontal direction to the left and to the right.

The press cylinder 1 has a cover 11 at the left with a wide discharge opening 12 for the bones having an inner diameter which is equal to or slightly less than the inner diameter of the annulus 9. This cover 11 is rigidly connected to the press cylinder 1, for instance through a flange connection not shown. Between cover 11 and the front face of press cylinder 1 an opening is left, which in horizontal section has a rectangular shape and which extends vertically entirely through these parts so as to be open at top and bottom. In said opening the body 13 of a slide valve is guided. A hydraulic or pneumatic cylinder 14 only shown in part is adapted to move the slide valve body 13 up and down and is of course provided with supply and discharge means and control means for a fluid under pressure in the usual way to move the slide valve up and down when desired.

The slide valve body has a large discharge opening 15 for allowing the bones to pass therethrough, with an inner diameter equal to or almost equal to the inner diameter of the annulus 9 and of the discharge opening 12. In FIG. 1 the body 13 is shown in the position closing the space within the press cylinder from the discharge opening 12. In the slide valve body 13 a circular body 16 is mounted for discharging meat as will be described below. The body 16 is provided with a large number of small perforations, so small that bones and splinters thereof cannot pass therethrough, but which are adapted to allow the passage of the meat which by the pressure in the pressing space has been transferred into a past-like condition. The perforations in the body 16 may, in a manner known as such, have a smaller diameter where they border the press space and have a wider diameter at a distance therefrom, more to the left in FIG. 1. For instance they may have a diameter of 1 mm in their right hand face and at some distance to the left they may have a diameter of for instance 3 mm and there may be a gradual or a sudden transition from the narrower to the wider parts. Thereby hard particles entering the perforations will never cause clogging or jamming but will always be discharged with the meat paste as they will very soon reach a wider part of the perforations. Such perforations have been indicated by dot and dash lines 17 in a diagrammetic way in FIG. 1. In its left hand face in FIG. 1, the body 16 has a number of concentric annular collecting spaces 18 giving communication with passages 19 in the slide valve body 13 so that the meat paste flowing through the perforations 17 may flow through said spaces 18 and passages 19 towards a meat paste discharge 20, to which for instance a hose or small discharge pipe may be connected by a screw-threaded connection as shown.

The front face of the press piston 2 carries a separate body 21 fitting with its outer periphery as a piston in the press cylinder as shown at 3 and as described above, and onto this body 21 a front face body 22 is mounted rigidly, having a large number of perforations 23 corresponding to the perforations 17 in body 16. The body 22 has a number of annular recesses 24 into which meat which in the press space is transferred into a paste-like condition, may enter through the perforations 23, which meat thereafter may flow through bores 25 in body 21 and from there outwardly into the space 4 and from there to space 5 and discharge 6.

The operation of this press is as follows:

the piston 2 is retracted entirely to the right in FIG. 1 not only to leave the press cylinder 1 but also to liberate at least the greater part of the filling space immediately to the right of wall 8. A quantity of bones with adhering meat is now brought into said filling space, for instance bones remaining after trimming of the slaughtered annimal and having meat remnants connected thereto. Said filling space is now closed and piston 2 is now moved to the left in FIG. 1. The slide valve 13 is in the position as shown. The piston 2 does move said bones with meat from the filling space into the press cylinder 1 and when the piston 2 has moved forward to the left sufficiently, said mass is put under pressure as it is enclosed between said piston, the peripheral wall of the press space in cylinder 1 and the front face of the body 13 of the slide valve formed by the body 16. By the pressure thus exerted on the mass the meat is brought into a paste-like condition so that it may easily flow and thus leaves the press space through the perforations 17 in body 16 and 23 in body 22 so as to flow towards the discharges 20 and 6 respectively. During this pressing, the annulus 9 is pressed tightly by the pressure against the slide valve body 13 to give a good closure of the press space.

When in this way meat has sufficiently been removed the pressure on piston 2 is lowered, either by lowering the pressure in the hydraulic or pneumatic cylinder driving piston 2 or by keeping the piston stationary during a short time interval, during which the pressure in the press space will gradually decrease by meat flowing out, and thereafter a situation is reached in which slide valve 13 is more easily movable because of the lower pressure and now this slide valve 13 is moved downwardly until opening 15 is exactly covering the opening in annulus 9 and the discharge opening 12. Piston 2 is now moved farther to the left in FIG. 1 and will thus move the bone cake with bones from which the greater part of the meat has been removed, through opening 15 and opening 12 outwardly. The outer periphery of the body 22 on the front face of the piston and carrying the perforations 23 will fit with small clearance into annulus 9.

When slide valve 13 is thus moved downwardly, the body 16 will slide with its right hand face along the lower part of the opening in annulus 9, whereby this surface is scraped clean so that possible bone splinters remaining at the entries before the narrow perforations 17 will be scraped off and will remain within the annulus 9 in the press space, so that they may be pressed out through openings 15 and 12 in the subsequent pressing out of the remaining bones. This gives a cleaning of the openings of perforations 17.

When thus removing the bone cake the press piston 2 may move to the left to such an extent that the front face of the body 22 will be positioned flush with the right hand bordering face of the slide valve body 13 and the left hand bordering face of the annulus 9. Thereafter the slide valve 13 is closed again by moving upwardly and thus the lower part of the edge of the discharge opening 15 will scrape along the front face of body 22, so that the openings of perforations 23 will be cleaned by scraping off hard parts such as bone splitters which may have accumulated at the entries of such perforations. When further moving slide valve 13 upwardly the bodies 16 and 22 will move with their front faces along each other, which gives a further cleaning.

The body 16 in the slide valve may be used without the body 22 on the front face of the piston 2 and the reverse is also possible. If only perforations in a body such as 16 in the slide valve are applied, this may mean that for part of the meat transferred into a paste-like condition the path to be laid back through the mass of bones towards the discharge becomes so long as to be undesirable, but in such a case the body 16 in the slide valve with its perforations may be combined with discharge openings in the wall of the press space for instance as given in Netherlands Patent Application Nos. 74.05531 and 74.11576, which, however, is only possible with a smaller discharge opening for the bones, which has some disadvantages as compared with the embodiment shown. In FIG. 2, another possibility is shown in this respect.

Piston 2 may also be a plunger, i.e. a body not fitting at 3 in the cylinder but leaving a small slot all around its periphery within the cylinder 1, so that meat brought into paste-like condition might pass through said slot into the space 4 as indicated in the above to Netherlands Patent Applications. However, when applying a perforated front face body 22 on the piston as given in FIG. 1, a good and accurate sliding seal at 3 of the piston within the cylinder 1 is preferred.

The body 11 with discharge opening 12 may be omitted if only the slide valve 13 is taken up in suitable and strong guides at its vertical side edges and in this case the slide valve 13 may itself have a discharge spout, trough or guide for the bones moving up and down therewith. In such a case the perforated body 16 may have a meat discharge as a pipe or holes extending not downwardly as shown but to the left.

FIG. 2 shows another embodiment of a press according to the invention in a vertical section through the axis of the press cylinder. In this embodiment there is shown the press cylinder 1, the press piston 2 in its front part only and part of the slide valve 13. Within the press cylinder 1 there is a number of rings 26 one to the side of the other and enclosed between a shoulder 27 in press cylinder 1 near the annulus 9 and a sleeve 28. The rings 26 each have in their right bordering plane grooves 29 extending radially and evenly distributed around the entire periphery, said grooves having either a rectangular or semi-circular shape and having a length in the axial direction of not more than 1 mm, preferably somewhat less. The rings 26 at their outer periphery have a crenellated shape so as to be supported sufficiently within the press cylinder 1 while leaving axial passages 30 for the flow of meat paste. The sleeve 28 has the same crenellated shape at the outside and, at it right end in FIG. 2, is in contact with an end ring 31 enclosed between the endwall 8 and the bottom 32 of the filling space and the right hand end face of press cylinder 1. Between end ring 31 and press cylinder 1 there is the space 5 and the connection between the space 5 and the annular space 4 around the piston is formed by local recesses 33 in the left end of end ring 31. An O-ring 34 is positioned between cylinder 1 and end ring 31 to give a good seal while allowing some clearance to allow the end ring 31 to push the rings 26 and the sleeve 28 together and into contact with shoulder 27. The annular space 5 has a meat discharge opening 6 with suitable duct or pipe as in FIG. 1. The sealing ring 7 of FIG. 1 in this case is positioned within the end ring 31 as shown.

The slidable annulus 9 at the left end of press cylinder 1 overlaps the left ring 26 at the inside over a short distance and has the O-ring 10 positioned as shown between parts 9, 1 and 26. Helical springs 35, of which only one is shown, push ring 9 into close contact with the slide valve 13.

The slide valve 13 has its opening 15 below the body 16 instead of above it as in FIG. 1. The body 16 with perforations in this case is formed by separate concentric rings 36 engaging one behind the other by an inwardly protruding annular part 37, the innermost separate ring 36 having such an annular inward flange engaging behind a central body 38 bolted to the body of the slide valve 13 as shown. The annular inwardly protruding parts 37 are also crenellated to allow passage of meat paste so that this may flow through perforations 17, formed by crenellated parts on the rings 36, to collecting annular spaces 18, from which the meat paste may flow to channels 19 in a separate body 39 in slide valve 13. There may be a discharge from this space 19 for the meat paste either upwardly or to the left as shown and this will be clear by looking at FIG. 1 and reading what is said about the meat discharge with reference thereto. The slide valve body in this case has a screw-threaded hole 40 at its top, giving a screw-threaded connection to a piston rod of a hydraulic or pneumatic cylinder not shown for moving the slide valve up and down in suitable guides not shown.

At the left end of piston 2 there is a body 22 as in FIG. 1 but this consists in FIG. 2 of separate rings 41 engaging one behind the other by inwardly directed flanges 42, the inner one of such flanges engaging behind a shoulder in a central body 43 bolted to the piston. The perforations 23 are here also formed by crenellations like the perforations 17 in body 16 in the slide valve and the flanges 42 also are crenellated to allow the passage of meat paste axially to collecting spaces 42, from where the meat paste may flow to openings 25 in a separate body 21 at the front of the piston, leaving radial passages 44 for guiding the meat paste from the openings 25 radially outwardly into space 4 between piston and cylinder. The body 21 as in FIG. 1 forms the piston head which contacts the cylinder, in this case the sleeve 28 and the rings 26 therein along the surface 3. The body 21 protrudes to the left free from the inner wall of sleeve 28 and rings 26 by a conical part 45, which fits into the conical inside surface an annulus 9 with slight clearance.

The operation of this press is in essence the same as that of the press of FIG. 1, but the separate rings 36, 41 and 26 allow easy disassembling and cleaning of the concerning parts. As in FIG. 1, moving of the slide valve 13 cleans the entries to the perforations 17 by the edge 46 of annulus 9, and allows cleaning of the entries to the perforations 23 in body 22 when these are moved up to the right hand plane of slide valve 13 in FIG. 2 by closing the slide valve so that the edge 47 of opening 15 moves downwardly along and in contact with the entries of perforations 23 to clean them. On further closing of the slide valve, the bodies 16 and 22 move along each other, giving further cleaning.

As described with reference to FIG. 1, part of the perforations may be omitted, for instance part of or the entire body 16, part of or the entire body 22 and part of or the entire set of rings 26.

I claim:

1. A press for putting under pressure therein animal meat with bones, reducing the meat to a paste-like condition and discharging the meat, having a front end and a rear end, comprising a press cylinder having a pressing body movable therein back and forth in the direction of the axis of the cylinder from the front end to the rear end and vice versa to exert pressure on the meat, means at the rear end of the press for moving the pressing body, the front end of said pressing body fitting in the inner wall of the press cylinder, said press cylinder having a first opening for the bones at the front end of the press, a second opening in the front end of the cylinder, a slide valve guided in said second opening, and movable up and down in a direction perpendicular to the direction of the pressing body, said slide valve being adapted to open and close said second opening, said valve when open allowing discharge of the bones through said first opening, a plurality of perforations in a second body mounted on said slide valve to allow passage of meat in paste-like condition, an outlet for the meat in paste-like condition in communication with said perforations at the front end of the press, a press space in said press cylinder defined by said pressing body and said second body, said second body which has perforations being movable to allow the perforations to slide along a metal part of the press by moving the slide valve.

2. A press for putting under pressure therein animal meat with bones, reducing the meat to a paste-like condition and discharging the meat, having a front end and a rear end, comprising a press cylinder having a pressing body movable therein back and forth in the direction of the axis of the cylinder from the front end to the rear end and vice versa to exert pressure on the meat, means at the rear end of the press for moving the pressing body, the front end of said pressing body fitting in the inner wall of the press cylinder, said press cylinder having a first opening for the bones at the front end of the press, a second opening in the front end of the cylinder, a slide valve guided in said second opening, and movable up and down in a direction perpendicular to the direction of the pressing body, said slide valve being adapted to open and close said second opening, said valve when open allowing discharge of the bones, a plurality of perforations in the front face of said pressing body, an outlet for the meat in paste-like condition of the rear end of the press in communication with said perforations, a press space in the press cylinder defined by said pressing body and said slide valve, said pressing body moving with its front face into the corresponding front end of the slide valve, when the slide valve is in an open position, said pressing body being movable to such a position that the perforations slide along a metal part of the press by moving the slide valve.

3. A press according to claim 2 wherein said front face of the pressing body in open position of the slide valve is movable to be positioned exactly in the plane coincident with the front face of the slide valve, limiting the space within the press in closed position of the slide valve.

4. A press according to claim 3, wherein the perforations are provided in a body which forms the front face of the movable pressing body and behind the body with perforations forming the front face of the movable pressing body there is a space in said body for giving a flow connection for meat paste passing through said perforations to the outer peripheral wall of the movable pressing body behind said body with perforations, the pressing body behind said body with perforations having a clearance in and with respect to the inner surface of the press cylinder, said clearance space giving connection to said discharge for meat paste positioned at a distance away from the slide valve.

5. A press according to the press space around the opening thereof bordering the slide valve is provided with a separate annular body, which is pressed by the pressure during pressing in said press space against the slide valve, the front face of the movable pressing body being movable into and out of said annular body with slight clearance between said front part of the press body and said annular body.

6. A press according to claim 1 wherein a plurality of perforations is provided for allowing passage of meat paste in the peripheral wall of the press space substantially perpendicular to the direction of movement of the pressing body.

7. A press according to claim 6 wherein said perforations in the peripheral wall are arranged in a separate sleeve arranged within the press cylinder and leaving a space between its outer periphery and the inner periphery of the press cylinder, said space giving connection to one or more openings for discharge of meat from the press cylinder, positioned near the area where the movable press body enters the press space, said meat discharge opening or openings also serving for the discharge of meat paste, which leaves the press space through perforations in the front face of the movable pressing body.

8. The press according to claim 1 additionally comprising a plurality of perforations in the front face of said pressing body, said press being provided with outlets for meat in paste-like condition both in the sliding valve and at the rear end of the press.

9. The press according to claim 1 wherein the perforations are provided in a disc shaped body supported at the rear surface by a portion of the slide valve.

10. The press according to claim 2 wherein the perforations are provided in a disc shaped body supported in the rear surface by a part of the movable pressing body.

11. The press according to claim 8 wherein the perforations are provided in a disc shaped body supported in the rear surface by a part of the slide valve and in a disc shaped body supported in the rear surface by a part of the movable pressing body.

12. A press according to claim 2 wherein the press space around the second opening in which the slide valve is guided is provided with a separate annular body which is pressed by the pressure during pressing in said press space against the slide valve, the front face of the movable pressing body being movable into and out of said annular body with slight clearance between said front part of the press body and said annular body.

13. A press according to claim 2 wherein a plurality of perforations is provided for allowing passage of meat paste in the peripheral wall of the press space substantially perpendicular to the direction of movement of the pressing body.

14. The press according to claim 2 wherein said movable pressing body is a piston.

15. The press according to claim 1 wherein said perforations are smaller in the proximity of said press space and wider at the opposite end.

16. The press according to claim 2 wherein said perforations are smaller in the proximity of said press space and wider at the opposite end.

17. A press according to claim 1 wherein said front face of the pressing body in open position of the slide valve is movable to be positioned exactly in the plane coincident with the front face of the second body mounted on the slide valve.

* * * * *

UNITED STATES PATENT OFFICE
CERTIFICATE OF CORRECTION

Patent No. 4,141,113   Dated   February 27, 1979

Inventor(s) Theodorus Van Bergen

It is certified that error appears in the above-identified patent and that said Letters Patent are hereby corrected as shown below:

The correct filing date of British 23706/77 relied on for priority is June 3, 1977.

Signed and Sealed this

Eighteenth Day of September 1979

[SEAL]

Attest:

LUTRELLE F. PARKER

Attesting Officer   Acting Commissioner of Patents and Trademarks